Nov. 10, 1964
B. R. CAMERON
3,156,646
APPARATUS FOR DIGESTION OF WASTE REMOVED FROM SEPTIC TANKS
Filed July 3, 1962
2 Sheets-Sheet 1
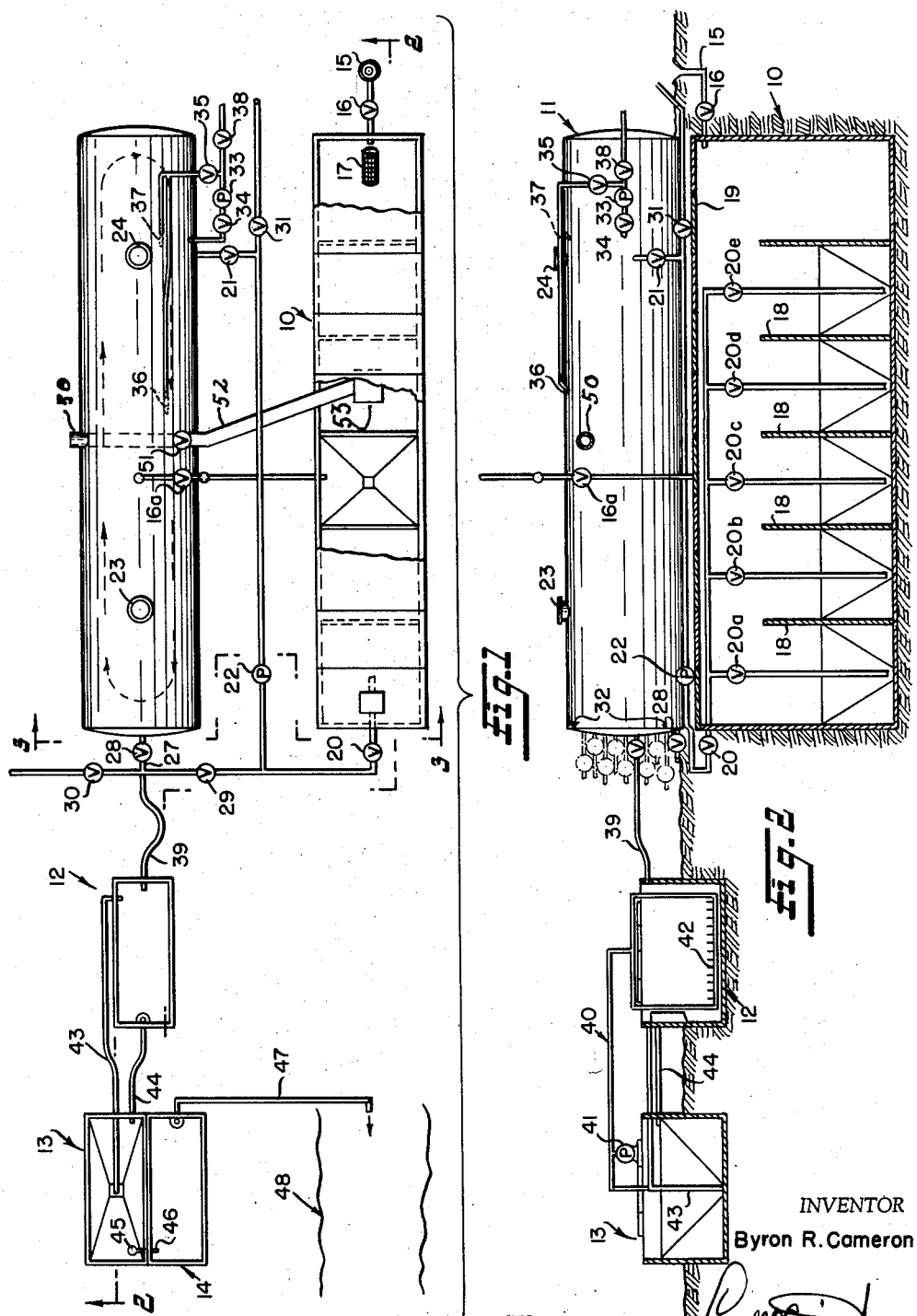
INVENTOR
Byron R. Cameron
BY
ATTORNEY Nov. 10, 1964 B. R. CAMERON 3,156,646
APPARATUS FOR DIGESTION OF WASTE REMOVED FROM SEPTIC TANKS
Filed July 3, 1962 2 Sheets-Sheet 2
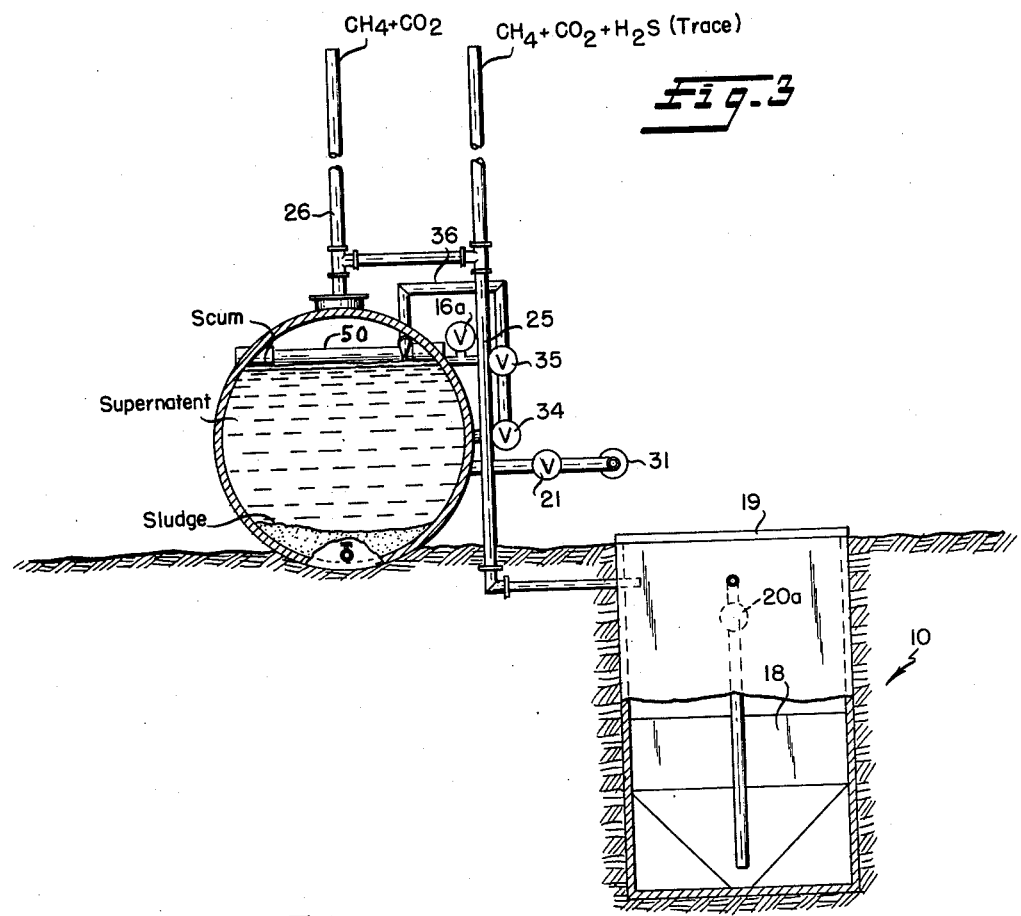
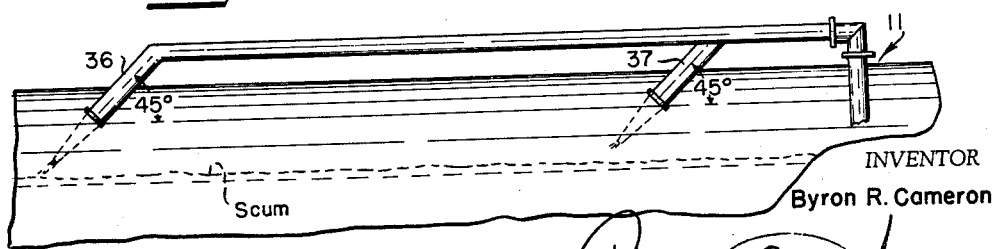
INVENTOR
Byron R. Cameron
BY
ATTORNEY United States Patent Office 3,156,646
Patented Nov. 10, 1964

1

3,156,646
APPARATUS FOR DIGESTION OF WASTE
REMOVED FROM SEPTIC TANKS
Byron R. Cameron, 1628 SE. 10th St.,
Fort Lauderdale, Fla.
Filed July 3, 1962, Ser. No. 207,282
2 Claims. (Cl. 210—195)

This invention relates to a process and apparatus for the digestion and volumetric reduction of waste removed from septic tanks.

Many processes and a large variety of apparatus have been developed for the digestion of basically raw sewage such as discharged into municipal sewage systems.

Yet, there are many cities and other densely populated areas, as well as urban areas, where central sewage systems either are not feasible or do not exist. For instance, some cities, especially in coastal regions, are built on land with such a low elevation above sea level that a central sewage system is not feasible. In such locations, septic tanks are used. Where septic tanks are used, the waste is not collected currently, as it is discharged, as is the case with central municipal sewage systems, but only periodically when it is necessary to remove waste from the septic tanks to assure the continued and efficient operation of the septic system. Thus, the waste removed from septic tanks is quite different from waste collected in municipal and like sewage systems, for much of the waste has been subjected to digestion for long periods of time, even years. As a result, the waste removed from the septic tanks is composed largely of digested, or stabilized sludge (solids) and contains relatively small amounts of partially digested recently discharged waste and current flushings containing raw sewage. For instance, a composite sludge waste pumped from septic tanks has a solids content consisting primarily of digested material and may contain a maximum of 2 to 3% of raw sewage. Also such waste normally is free of industrial waste which often is present in municipal waste and presents a special problem in digestion and disposal. Yet, when a composite waste is collected from various septic tanks, the solids in all these various phases of digestion are thoroughly dispersed throughout the liquids simultaneously removed from the septic tanks and are present in much greater concentrations than in municipal wastes.

It is apparent, therefore, that the problems associated with the digesting of, or completing the necessary digestion of, the waste removed from the septic tanks is quite different from the problems of digesting raw municipal sewage and the like. Yet, so far as is known, there is little, if any, information available which provides specific guidance for the solution of this unique problem. More particularly, there is no known simple, efficient, and economical method and apparatus which are tailored to the solution of the problems associated with the reduction and digestion of composite wastes collected from septic tanks.

It is a principal object of this invention to provide a novel, uncomplicated, and exceptionally efficient system and apparatus for digesting composite wastes removed from septic tanks. It is a more particular object of the invention to provide a system and apparatus especially well adapted for the digestion of waste removed from septic tanks in tropical, or semi-tropical, regions. Other objects, features and advantages of the invention will become apparent from the more detailed description which follows.

The invention will be described in connection with the attached drawings diagrammatically representing an operating unit capable of the monthly disposal of 150,000 gallons, or more, of septic tank sludge removed from septic tanks in a municipality in southeastern Florida. The system will be considered to be in operation since no problems are involved in the starting up of the operation of the system.

In the drawings:
FIG. 1 shows a plan view of the system;
FIG. 2 shows an elevational view of the system;
FIG. 3 shows an elevational view taken along lines 3—3 of FIG. 1; and
FIG. 4 shows a fragmentary perspective view of jets shown diagrammatically in FIGS. 1 and 2.

In the drawings, like numbers are used to represent the same or equivalent elements. In the purely illustrative embodiments of the invention, there are five horizontally positioned tanks, or chambers, generally designated by the numerals 10, 11, 12, 13 and 14. Tank 10 is the receiving, or primary settling tank; tank 11 is the digester; tank 12 is an aeration tank for supernatant liquid, tank 13 is an intermediate settling tank for supernatant, and tank 14 is the final settling tank for the supernatant liquid. In the usual operation of the system, at the end of the day, sufficient supernatant and digested sludge is pumped up from tank 10 to tank 11 to the level of the overflow pipe so that adequate space will be provided in tank 10 for the collections from septic tanks on the following day. Customarily, there is sufficient transfer of liquids and solids from tank 11 during the day to permit such transfer from tank 10. The system is set up so that tank 10 customarily is operated in a partially filled position, say about three-fourthes full. Due to the fact the overflow pipe between tank 11 and tank 10 normally is open, tank 11 customarily operates at its partially filled overflow level. Liquid levels in supernatant disposal tanks 12, 13 and 14 are determined by gravity flow through the connecting pipes and the tanks normally are filled with supernatant.

In the operation of the system, sludge pumped from septic tanks and collected in tank wagons is permitted to flow by gravity through pipe line 15, value 16 and wire basket 17 into tank 10. Wire basket 17 serves to catch undesirable objects such as rags, sanitary napkins, plastic goods, such as baby pants, etc. but could be replaced with a shredder, comminutor, or the like. Tank 10 is located below ground level to facilitate gravity flow of fluid and is a generally rectangular tank provided, as illustrated, with five substantially equidistant partitions, or baffles, 18 extending somewhat less than halfway up the sides of the tank and dividing the tank into a series of dams forming compartments, or bins, all except the first in line terminating in hopper-like bottoms provided with draw-off pipes located at the bottom thereof for the removal of digested sludge and the like. Baffles 18 form dams in tank 10 and retard the fast flow of sludge across the tank thereby facilitating the separation of stones, sand, certain digested sludge, inactivated or stabilized sludge, and like solids which would ordinarily sink. In this way, they are precluded from entering pumps and unnecessarily loading the part of the system primarily concerned with the reduction and digestion of the undigested sludge. The various bins can be pumped out, as needed, through the draw-off pipes to remove digested gels, or slurries. Tank 10 is provided also with covers 19 which permit access to tank 10 to periodically remove solids from the compartments formed by the partitions 18, or the like, not removed in the above noted manner as, for instance, by digging out the solids with clam buckets. In this way, a major proportion of the solids in the septic waste are collected in the primary settling tank.

When it is desired to remove sludge from tank 10, valves 20 and 21 are opened and pump 22 is set into operation and the desired quantity of sludge is thereby pumped from the lower regions of the end compartment of tank 10 into supernatant regions of digester 11 through the respective conduits in which these valves occur (all valves, except valve 16 and 16a, are closed unless otherwise indicated).

Digester tank 11 is a cylindrical steel tank. In a particular embodiment, tank 10 is 10 feet in diameter and 45 feet long, located above ground and painted black to facilitate the absorption of solar heat thereby heating up the sludge. It is known that anaerobic bacteria function best at temperatures of at least 90° F., and customarily such temperatures are readily developed throughout the year in tank 10 in semi-tropical or tropical regions and in the summer in temperate regions. It will be recognized that a favorable temperature for digestion can be provided by a gas, or gasoline, blower directed into an air tube connected to the digester. Ready access to the interior of digester tank 11 is provided by manholes 23 and 24 located near the top thereof. Digester 11 is provided with a combined overflow protection and vent pipe 25 cut in a wall thereof about one foot below the tank crown and returning to tank 10 (FIG. 3) and with a centrally located vent 26.

Digester 11 has other important features. It is provided with a 4 inch pipe 27 at the bottom having control valve 28 and tubular branches controlled by valves 29 and 30. When valves 21, 28 and 29 are open and pump 22 is in operation, the layer of high solids content sludge, normally lying in the bottom region of tank 11, is recycled into the basically liquid supernatant layer thereabove for more complete reduction and digestion. When valves 28 and 30 are open, the sludge, usually digested or innocuous, may be drawn off by gravity for disposal. After the sludge has built up in the digester 11 to a depth of about 3 feet, it should be recirculated for about 2 hours. This will further reduce the sludge by anaerobic decomposition as well as further treat particles of grease imbedded in the sludge. If innocuous sludge cannot be removed by gravity, it can be pumped out by pump 22 by opening valves 28, 29 and valve 31 in a branch conduit which would lead to a disposal area or a tank truck having a loading zone located too high for gravity flow.

Digester 11 is also provided with nine one inch valved outlet pipes about one foot apart, generally designated 32, which may be used for sampling purposes and for removal of supernatant as expained below.

Another important feature of the instant digestion system is the provision of a pumping system serving to recycle the supernatant in the digester 11 so as to improve digestion while effectively avoiding the building-up of a scum blanket or, in the alternative, serving to wash down and clean out delivery trucks without introducing diluents into the system. When pump 33 is operating and valves 34 and 35 are open, supernatant is withdrawn from the supernatant layer well above the normal level of the sludge layer and jetted into the blanket, or scum layer, through a pair of jets 36 and 37. Jets 36 and 37 are located well to one side of the axis of digester 11 and are set at an angle of about 45° so that the jetted supernatant enters the blanket at an angle of 45° relative to a line in the plane of the scum passing through the point of contact and parallel to its longitudinal axis. In this way, the blanket is broken-up and jetted down into the supernatant as it rotates within the digester as shown by the arrows in FIG. 1. A surface circulation of the supernatant layer caused by this jetting action complements "bottom to top" normal digestive circulation. Thus, the blanket is gradually broken up and forced to become a part of an accelerated digestive system and the supernatant is aerated to further increase the overall speed of degradation and digestion. It will be understood, however, the circulation is only periodic and the liquid within tank 11 normally is not being subjected to external agitation.

When pump 33 is operating and valves 34 and 38 are open, the supernatant may be pumped through a hose to wash down the interior of tanks on delivery trucks (not shown) so that sand and other undesirable contents may be removed and introduced into settling tank 10 in the usual way. This further causes more circulation of indigenous enzymes or added enzymes (catalysts), throughout the system without the addition of water which would only serve to dilute the waste being treated.

The stage and level of the digestion of the waste in digester 11 can be evaluated by sampling through valved outlet pipes 32 in a known way. For example, it is well known that organic matter such as involved in the instant case is degraded by anaerobic bacteria into acid constituents thereby imparting to the waste an acid pH. As digestion proceeds, the acidic constituents and other degradation products are consumed or converted into non-acidic constituents so that the sludge mass becomes substantially neutral. Thus, the desired degree of digestion can often be determined by pH determination. In most instances, however, a desired degree of digestion can be determined by examing the clarity of the supernatant.

Digested sludge may be withdrawn in the manner described above.

When a desired degree of digestion has been determined, flexible tube 39 is connected up to the valved outlet 32 within the supernatant zone and the valve opened so that supernatant flows by gravity into the first of three 2000 gallon supernant treatment tanks, namely, aeration tank 12, and thence to intermediate settling tank 13 and final settling tank 14 which are graded for gravity flow. All the supernatant is thoroughly aerated in tank 13 by an aeration system generally designated 40 so that the anaerobic bacteria is burnt out by the oxygen of the air. The system contains an air pump 41, suitable connecting pipes and an aeration spray bar pipe 42 located near one side of rectangular tank 12 which is provided with a series of holes facing up, so that when air is forced through these holes it breaks to the surface of the liquid and, at the same time, causes the entire mass of liquid to roll around in tank 12 in a circular fashion. Aeration system 40 also is provided with an air arm 43 which continuously pumps any solids collected in the bottom of hopper-like tank 13 back into aeration tank 12.

Whenever supernatant is introduced into aeration tank 12, fully aerated supernatant overflows into intermediate settling tank 13 through overflow pipe 44 where it remains in a quiescent stage except for the slight flow eddy caused by solids being pumped back into aeration tank 12. At the same time, the supernatant in intermediate tank 13 flows into final settling tank 14 through weir 45 and pipe 46, while supernatant in final settling tank 14 overflows through pipe 47 into subsurface drainfield 48, or other appropriate disposed area.

The process and apparatus has other advantageous features. For instance, by operating pump 22 and opening valve 20 and 31 and any one of the valves 20a, 20b, 20c, 20d or 20e, innocuous fluids such as gels or slurries may be pumped out of the hopper-like bottoms of any one or more of the compartments in tank 10 formed by the partitions 18 through the draw-off pipes. It will be observed the first compartment in line is not supplied with a draw-off pipe. It has been found the first compartment collects substantially only sand and small stones which must be removed by a clam bucket or the like.

It has been found very advantageous to supply tank 11 with a skimmer 50 supplied with valve 51. Skimmer 50 is located at the normal liquid level of tank 11 to the left of jets 36 and 37 (as best shown in FIG. 1 and FIG. 2) and is merely a 6 inch diameter, or larger, pipe with the top cut out and fitted into two pipe couplings so that it can be rotated 15° in either direction from the horizontal. In this way, its open face may be oriented towards either end of the digester 11 and floating objects skimmed from first one end and then from the other end of the tank. By closing valve 16a and opening 20 and 21, supernatant may be pumped by pump 22 from tank 10 into tank 11 until any difficult to digest (or even impossible to digest) material such as plastic goods and cotton material may be forced to overflow into the skimmer 50 and thence through chute 52 into the basket strainer 53. In this way, a much cleaner and a much easier to dispose of blanket is obtained and may be maintained during operation of the process.

Also, it has been found highly advantageous, although not necessary, to inject an anaerobic enzyme into either or both of the tanks 10 and 11. It has been found such enzymes accelerate the digestion and possibly give a heavier digested sludge. Such enzymes can be used to increase the usual capacity of the system or they can be used during unexpected peak periods to avoid overloading or back-up of waste collected from the septic tanks. A commercial anaerobic enzyme mixture sold under the tradename Kemzyme has been found quite satisfactory. Kemzyme is said to be a mixture of eight different enzymes and is distributed by Refreshener Sales and Service Co., 1040 East 33rd Street, Hialeah, Florida.

It will be seen readily that the foregoing plant for the treatment and reduction of sludge removed from septic tanks is uncomplicated and exceptionally efficient, utilizing only three pumps for the removal of sludge from treatment zone to treatment zone and for the treatment of sludge and supernatant in these zones. By following the system described above, it has been found possible to reduce the volume of septic tank sludge by 82%. This system is remarkably free from obnoxious odors. In fact, even though the plant is located in a residential area, it has been found unnecessary to maintain the covers on the manholes of the digester.

It will be observed further that the digester has approximately twenty times the volume of the tanks used for the treatment of supernatant. The primary settling tank preferably is somewhat longer than the digester to increase settling capacity and decrease load on the digester. In some instances, it is advantageous to have a settling tank with a capacity larger than that of the digester. In this way, the average period of residence of waste in these tanks is greater than in the supernatant treatment tanks. On the other hand, the tanks used for digestion of the solids in the waste sludge are frequently operated in only a partially filled condition, thereby imparting important flexibility to the process. For example, if one should visualize about 22 days in a working month, the system would be required to dispose of about 7000 gallons of sludge each working day (1/22 of 150,000). Even assuming the collecting tank had the same capacity as the digester and that it normally operated at about 3/4 capacity, about 18,000 gallons, it would receive all of one days collections by transferring only 1,000 gallons to the digester which has about 25,000 gallons capacity. Since the digester also is frequently operated in a partially filled condition, it is seen that the period of residence in the digestion part of the system may be varied greatly to accommodate to favorable or unfavorable digestion conditions. This flexibility is also important to enable one to compensate for the variations in the type of sludge collected from the septic tanks. Additionally, it is apparent the sludge may be run through the system more rapidly than normal under favorable conditions to prepare for anticipated unfavorable conditions.

Recently, the apparatus illustrated herein processed 192,000 gallons of sludge in one month.

Those skilled in the sewage treatment art will be aware of the fact that the details given hereinbefore for illustrative purposes may be varied exttensively without departing from the spirit of the invention or its scope as defined in the appended claims.

I claim:
1. In an apparatus for the digestion of human waste:
    a primary settling chamber for said waste provided with a plurality of barriers reaching only part way to the top of the chamber and dividing the chamber into a plurality of compartments;
    a digestion chamber operable to form an upper supernatant liquid layer and a lower sludge layer;
    a conduit system interconnecting the lower regions of at least one of said compartments, said liquid layer, said sludge layer, and an outside disposal zone;
    a pressure means in said conduit system;
    control means in said conduit system permitting said pressure means to force said waste from said settling chamber selectively to said liquid layer and to said disposal zone and also permitting said pressure means to force sludge from said sludge layer selectively to said liquid layer and said disposal zone;
    at least one nozzle located in the upper region of said digester;
    a second conduit system interconnecting said nozzle, said liquid layer and an outside cleaning area;
    a pressure means in said second conduit system;
    control means in said second conduit system permitting said pressure means to force liquid from said supernatant liquid layer selectively to said nozzle and said cleaning zone;
    a plurality of outlets for withdrawing fluids from selected levels of said digester; and
    a skimmer system for skimming and withdrawing materials from the supernatant liquid layer in said digester.
2. The apparatus of claim 1 wherein the settling chamber is located below ground level and the digestion chamber is located above ground level and is colored black.

References Cited by the Examiner

UNITED STATES PATENTS

| | | | |
|---|---|---|---|
| 745,870 | 12/03 | Lowe | 210—532 XR |
| 951,742 | 3/10 | Rothwell et al. | 210—512 XR |
| 1,123,320 | 1/15 | Kusch | 210—294 |
| 1,734,011 | 10/29 | Harrison | 210—14 XR |
| 2,022,481 | 11/35 | Schellenger | 239—127 XR |
| 2,359,004 | 9/44 | Schlenz et al. | 210—8 XR |
| 2,516,076 | 7/50 | Schlenz | 210—14 XR |
| 3,078,999 | 2/63 | Kelly | 210—14 XR |
| 3,133,878 | 5/64 | Kober | 210—512 XR |

FOREIGN PATENTS 837,561  6/60  Great Britain.

MORRIS O. WOLK, *Primary Examiner.*